R. RICHTER.
MULTIPLE CONTROL OF ELECTRIC MOTORS.
APPLICATION FILED APR. 9, 1912.
1,080,588.
Patented Dec. 9, 1913.
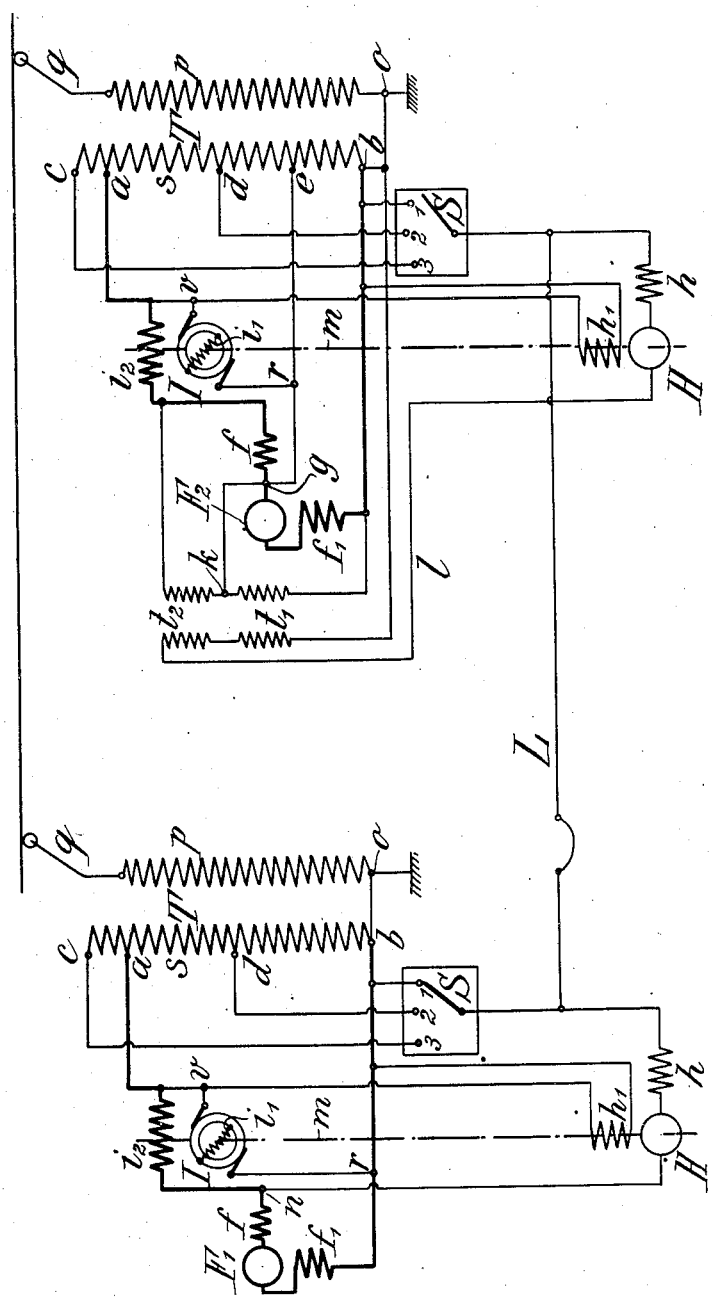

UNITED STATES PATENT OFFICE.

RUDOLF RICHTER, OF GRÜNAU, GERMANY, ASSIGNOR TO MAFFEI-SCHWARTZKOPFF WERKE G. M. B. H., OF BERLIN, GERMANY.

MULTIPLE CONTROL OF ELECTRIC MOTORS.

1,080,588.  Specification of Letters Patent.  Patented Dec. 9, 1913.

Application filed April 9, 1912. Serial No. 689,590.

*To all whom it may concern:*

Be it known that I, RUDOLF RICHTER, a subject of the German Emperor, residing at Grünau, Mark, Germany, have invented new and useful Improvements in Multiple Control of Electric Motors, of which the following is a specification.

For starting and regulating separately fed electric motors, for instance the motors of several motor-driven vehicles of an electric railway, from one place (multiple control) the hitherto employed systems require in general at least as many control leads as the number of switching steps or stages provided, when the position of the control switch shall substantially direct the load condition of the motors to be controlled. The control leads, which have to be extended through all the carriages of electrically driven trams render the arrangement complicated and difficult of inspection, when the control switch has a large number of switching steps, and in addition complicated auxiliary devices are necessary or a number of separate devices, corresponding to the number of switching steps, which devices may give rise to irregularities in working. The regulation is in general not continuous, but stepwise. The present invention avoids these difficulties. It will admit of particularly simple and effective control of separately fed electric motors by the difference between the electromotive force at the respective driving motors or corresponding parts of the windings of these motors and an electromotive force which can be arbitrarily adjusted by the control switch being utilized to actuate a device for regulating the electromotive force to be supplied to the driving motors, which device will vary the electromotive force at the motors until the difference compared to the electromotive force adjusted by the control switch is again compensated, in other words until the electromotive force of the driving motors or that at corresponding parts of the winding of these motors is equal to the electromotive force adjusted. On railways operated by alternating current the difference in electromotive force is made to act on the auxiliary motor, which drives the induction regulator (rotary current transformer) intended for regulating the electromotive force of the vehicle motors. By such means it will be possible by suitably constructing the control switch, to obtain any desired number of switching steps, without more control leads having to be laid than are necessary for driving the auxiliary motors, for which purpose in general one lead will be sufficient. The further advantage is also obtained, that the pressure at the driving motors can be continuously varied instead of stepwise as with the hitherto customary control systems.

When the motors to be controlled are of different types corresponding winding, namely such at which the same or proportional electromotive forces occur, will not be always accessible. For example if in one of the driving motors, which may be assumed as alternating current series motors the field winding and the working winding are connected, but separate in the other or the others, the field windings cannot be taken into consideration as winding parts in the sense of the present invention as in this case the electromotive forces would not be equal at the field windings of the several motors. These special auxiliary windings would have to be provided in the motor, at which corresponding electromotive forces will appear. It is therefore advisable and also for this reason more simple as no tapping of the motors is required, to connect the whole electromotive force of the motor in opposition to that adjusted by the control switch only, instead of the electromotive force of a single winding part only.

The electromotive forces must obviously relate to the same current in motors of the same power, in other words such winding parts must be taken into consideration, the electromotive force of which is the same at the same amperage. When the motors to be controlled are wound for different voltages, the electromotive forces must be suitably converted by transformers. A voltage transformation may also sometimes be of advantage in respect to the auxiliary motors, which are then not directly under the influence of the differential voltage but are connected to the respective points over a transformer. In motors fed from two sources an auxiliary transformer must usually be provided for both the stator and the rotor the secondary windings of which auxiliary transformers are connected in series.

In the drawing the invention is exemplified in diagram applied to alternating current electric motors. The diagram relates to a train composed of two driven vehicles, the driving motors of which can be simultaneously controlled from the one or the other driver's stand. On the left hand of the drawing an ordinary series motor $F^1$ is shown as driving motor, and on the right hand side a motor $F^2$ fed from two sources, for the purpose of showing the application of the invention to driving motors of different types.

The energy is supplied to the motors through the transformers T, which again are fed from the feeder line by means of collectors $q$. The other ends of the primary windings $p$ of the transformers are grounded. The leads connecting to the driving motors $F^1$ or $F^2$ respectively are branched off at $a$ and $b$ respectively to the secondary winding $i^2$ of an induction regulator or rotary transformer I, which serves to regulate the electromotive force supplied to the driving motor. This is done in the known manner by turning the primary winding $i^1$ of the induction regulator, which is connected at $v$ and $r$ to the secondary winding of the transformer T. The rotation of the induction regulator is effected by means of a transmission gearing, indicated in the drawing by the reference latter $m$, from an auxiliary motor H which is shown as motor having independent excitation. The field winding $h^1$ connects the same as the primary winding $i^1$ of the induction regulator to a constant voltage of the transformer T. The working winding $h$ is connected at one end to the switch levers of the control switch S, at the other in the diagram shown on the left hand of the drawing to the connection $n$ between the motor $F^1$ and the secondary winding $i^2$ of the induction regulator, so that at the working winding of the respective auxiliary motor H there will prevail an electromotive force composed of the step voltage of the transformer corresponding to the respective position of the control switch, and the voltage at the driving motor $F^1$. In the vehicle with double circuit driving motor $F^2$ according to the right hand of the drawing a voltage will be produced by the transformers $t^1$ and $t^2$ which is equivalent to the total voltage of the series motor $F^2$, the primary windings of the said transformers being connected to the field winding $f^1$ and the working winding $f$ respectively of the motor $F^2$. The common middle lead which proceeds from a point $k$ between the primary windings connected in series, is connected at $g$ to the point of connection of the working winding $f$ to the field windings $f^1$ of the motor $F^2$, from where a compensating lead connects in known manner with a point $e$ in the secondary winding $s$ of the transformer T. From this lead is branched off at $r$ the feeder for the primary winding $i^1$ of the induction regulator I, the other end of which is connected the same as shown on the left hand of the drawing over $v$ at $a$ to the secondary winding $e$. With this constructional form the end of the working winding $h$ of the auxiliary motor H, which is not connected to the control switch S, is connected to the secondary windings of the auxiliary transformers $t^1$, $t^2$, connected in series to the other end of which is connected at $b$ with the secondary winding $s$ of the main transformer T. The contacts 1, 2 and 3 of the control switch S are connected to the tapping points $b$, $d$ and $c$ respectively of the secondary of the main transformer. The number of these tapping points or switch contacts can of course be varied arbitrarily. Besides the switch may be replaced by an induction regulator of the kind as indicated by I, when it is desirable to continuously vary the electromotive force at the driving motors to any intermediate step. The leads connecting the auxiliary motors H and the switch levers of the control switch S are connected with each other by a lead L.

The operation of the arrangement is as follows: The control switch which is not in use is cut out. In the drawing this is the switch of the vehicle on the right hand. It may now be assumed that the train is at rest and no current is supplied to the driving motors. To such a condition corresponds a position of the induction regulator I, at which the electromotive force of the transformer T is compensated by that of the secondary windings $i^2$ of the induction regulator. The lever of the control switch S on the left stands on contact 1. It is obvious, that in this case neither of the auxiliary motors H will receive any current, so that the condition remains unchanged. When now the contact lever is moved to contact 2, the circuit containing the auxiliary motor H and the driving motor $F^1$, which proceeds from the point $d$ of the secondary winding of the transformer T and returns over the contact 2, the working winding of the auxiliary motor H and the point $n$ of the driving motor $F^1$ to $b$, contains an electromotive force corresponding to the transformer step $b$—$d$, which as the opposed electromotive force of the driving motor is at zero will act with its full force on the auxiliary motor H. The latter is rotated and will cause a rotation of the primary winding $i^1$ of the induction motor I, whereby the electromotive force in the secondary winding $i^2$ will be reduced, which is opposed to the electromotive force of the transformer T. The consequence will be that the electromotive force at the driving motor $F^1$ will increase in a direct ratio to the rotation of the induction regulator I by the auxiliary motor H. This will continue until the current acting on the auxiliary motor H, the amount of which depends on the difference between the electromotive force adjusted at the switch S and the gradually increasing electromotive force of the driving motor $F^1$, has returned to zero. The rotation of the induction regulator, and with it the variation of the electromotive force at the driving motor then ceases so that the electromotive force at the driving motor reaches a value which is essentially equal to that adjusted at the switch S. When the switch is moved on to contact 3, the just described process is repeated and the electromotive force at the driving motor reaches a value which corresponds to that adjusted at the contact 3. By such means it is possible to vary arbitrarily the electromotive force in working by shifting the driving switch, the number of steps of which is optional. In consequence of the several control switches being connected to each other by the lead L the electromotive force adjusted at the one control switch, say the left, will come also into action in the circuit of the other vehicle containing the auxiliary motor H and the corresponding winding parts (in the instance shown the secondary side of the auxiliary transformers $t^1$, $t^2$) of the driving motor $F^2$, so that the same process will occur here as in the other vehicle, the control switch of which has been operated. Therefore the electromotive force of all driving motors is simultaneously regulated exactly to a voltage corresponding to that adjusted by the control switch on the one vehicle.

The present invention may obviously also be applied with other kinds of current. If direct current is employed adjustable series resistances are provided or devices, which will effect an adjustment of the brushes for varying the voltage.

What I claim is:

1. A system for controlling separately fed electric motors from one place, comprising driving motors, an electric source therefor, means for changing the voltage impressed on said driving motors, means controlling said first named means, means whereby said second named means is under the control of an arbitrarily selected voltage, and connections whereby said second named means is rendered dependent upon the electromotive force of corresponding parts of the driving motors, so that the influence on the said last named means ceases as soon as the electromotive force becomes equal to the arbitrarily selected voltage.

2. A system for controlling separately fed electric motors from one place, comprising driving motors, an electric source therefor, means for changing the voltage impressed on said driving motors, auxiliary transformers in connection with some of the driving motors, said transformers being adapted to equalize the electromotive force of the corresponding driving motors with that of the driving motors not connected to the transformers, means controlling said first named means, means whereby said second named means is under the control of an arbitrarily selected voltage and connections whereby said second named means is rendered so dependent upon the electromotive force of the secondary of the said transformers that the influence on the said second named means ceases as soon as the electromotive force becomes equal to the arbitrarily selected voltage.

3. In an alternating current traction system, the combination with locomotives, each including a main transformer, a driving motor, a rotary additional transformer as voltage regulator for the latter, control switches and auxiliary motors for driving said rotary transformers on each locomotive, means for connecting the armature windings of said auxiliary motors to said control switches and to corresponding parts of the windings of said driving motors and means connected with said control switches for switching in different points on said main transformers.

4. In an alternating current traction system, the combination with locomotives, each including a main transformer, a driving motor, a rotary additional transformer as voltage regulator for the latter, control switches and auxiliary motors for driving said rotary transformers on each locomotive, means for connecting the armature windings of said auxiliary motors to said control switches and to corresponding parts of the windings of said driving motors, means connected with said control switches for switching in different points on said main transformers and leads connecting said control switches to each other.

5. In an alternating current traction system, the combination with locomotives, each including a main transformer, a driving motor, a rotary additional transformer as voltage regulator for the latter, control switches and auxiliary motors for driving said rotary transformers on each locomotive, the windings of the driving motor and the secondary windings of the rotary transformer of each being inserted in a circuit, the ends of which are connected to different points of the secondary winding of the respective main transformers, a control switch having a plurality of contact plugs on each locomotive, one of said plugs being connected to one end of said circuit, the other one to a point of the secondary of the respective main transformer, and leads connecting the armature windings of said auxiliary motors to the respective control switches and to a point of the respective circuit between the windings of said driving motors and the secondaries of said rotary transformers, respectively, said first named connecting leads of each locomotive being connected to each other.

In testimony whereof I have signed my name to this specification in the presence of two subscribing witnesses.

RUDOLF RICHTER.

Witnesses:
HENRY HASPER,
WOLDEMAR HAUPT.